United States Patent [19]

Stinson

[11] Patent Number: 5,186,118
[45] Date of Patent: Feb. 16, 1993

[54] WINDAGE-GAUGING METHOD AND APPARATUS FOR HUNTERS

[76] Inventor: Robert K. Stinson, 7292 Peaceful Valley Rd., Acme, Mich. 49610

[21] Appl. No.: 725,574

[22] Filed: Jul. 3, 1991

[51] Int. Cl.⁵ .......................... G08B 5/40; G01W 1/00
[52] U.S. Cl. .................................. 116/214; 116/273; 73/188; 73/170.01
[58] Field of Search ......... 116/214, 264, 273, DIG. 7; 43/1; 73/188, 189

[56] References Cited

U.S. PATENT DOCUMENTS

| | | | |
|---|---|---|---|
| 2,311,199 | 12/1940 | Astradsson | 73/189 |
| 2,320,359 | 7/1940 | Gatty | 73/188 |
| 3,092,827 | 6/1963 | Pearce | 116/214 X |
| 3,112,645 | 10/1962 | Glass | 73/188 |
| 3,150,875 | 9/1964 | Searles | 116/214 X |
| 3,658,719 | 10/1969 | McConnaughey | 252/359 A |
| 3,899,144 | 8/1975 | Werle et al. | 116/214 X |
| 4,423,626 | 1/1984 | Herschede | 73/188 |
| 4,953,763 | 9/1990 | Kierum et al. | 43/1 X |

FOREIGN PATENT DOCUMENTS

| | | | |
|---|---|---|---|
| 0532495 | 9/1931 | Fed. Rep. of Germany | 116/214 |
| 0059074 | 3/1989 | Japan | 116/214 |
| 2211305 | 6/1989 | United Kingdom | 116/264 |

*Primary Examiner*—William A. Cuchlinski, Jr
*Assistant Examiner*—John L. Beres
*Attorney, Agent, or Firm*—Price, Heneveld, Cooper, DeWitt & Litton

[57] ABSTRACT

A wind gauge includes silica particles dispensed from their container as a floating cloud which is carried along by ambient wind and thus illustrates wind speed and direction. The particulate media may also include a mixture of silica particles and thermoplastic color-pigmented particles, so that the floating cloud is colored and thus more easily visible. The particles may also embody a scent and be used to form a scent trail as they are carried along by the wind and as they gradually settle out of the air.

**

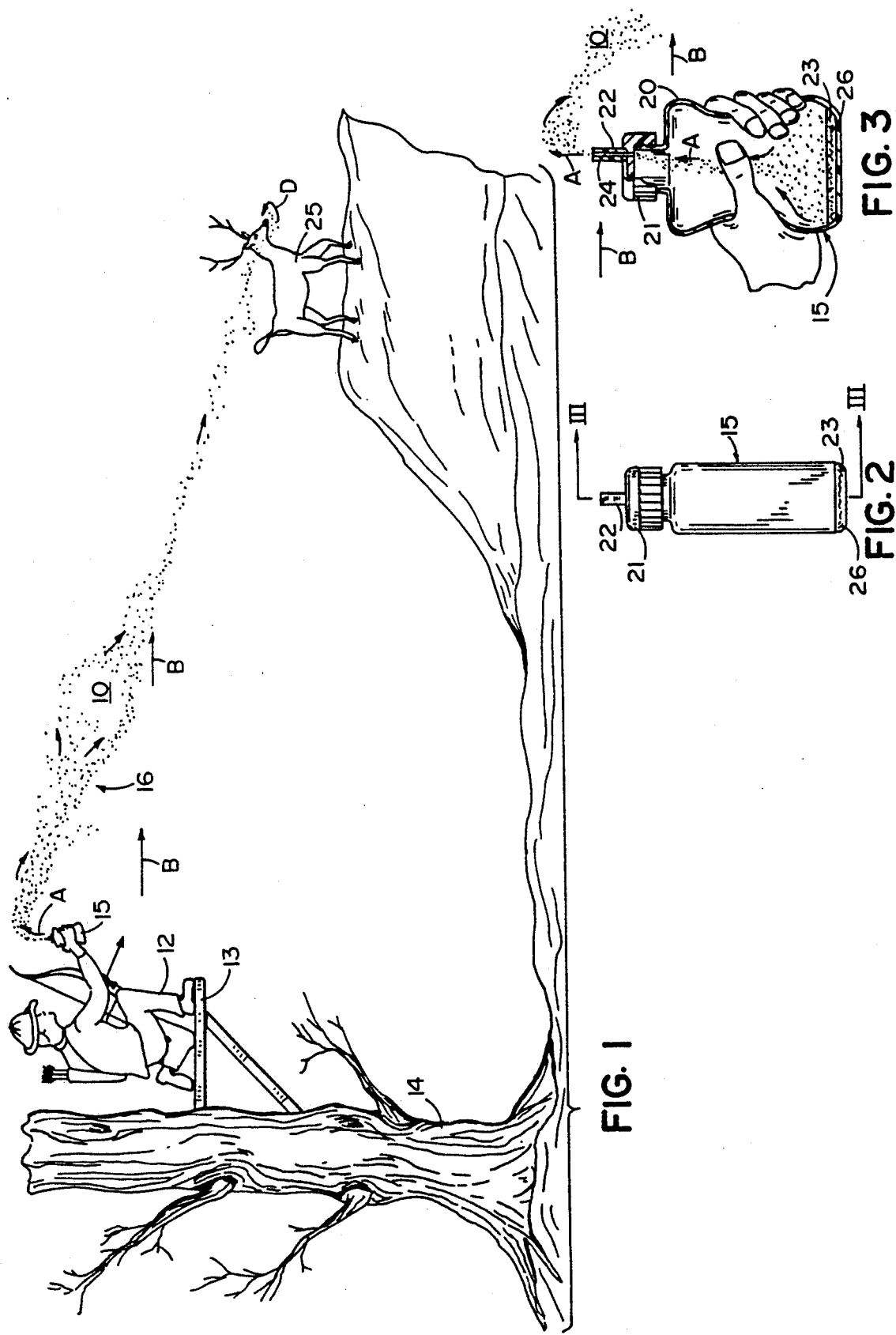

WINDAGE-GAUGING METHOD AND APPARATUS FOR HUNTERS

BACKGROUND OF THE INVENTION

The present invention relates to wind speed and direction gauging, and more particularly to use of lightweight particulate media for forming a floating cloud for this purpose.

Bow and rifle hunters, as well as other sports enthusiasts, have heretofore mainly had only makeshift methods and devices available to them for gauging wind speed and direction. This is particularly desirable for hunting purposes, while stalking or waiting in a blind for game, since game downwind from a hunter will avoid the hunter's position if the animals detect the hunter's scent. To avoid detection by the prey, hunters stalking animals attempt to monitor the wind and remain downwind therefrom. For bow hunters, in addition to gauging the general ambient conditions of wind speed and direction, it is also important to accurately gauge the particular windage that an arrow will experience when it is shot, since the wind has a significant affect on the trajectory of arrows.

In an attempt to accurately determine the wind speed and direction, meteorologists have used such things as balloons and chemical smoke dispensers which emit smoke which is visually monitored. Variations of such chemical dispensers may be mounted on the barrel of a hunter's rifle or otherwise set up by the hunter. However, chemical odors emitted by these dispensers, along with the odor of smoke, are easily detected by animals. Such odors are easily strong enough to be detected by the animal Consequently, the animals are alerted to the hunter's presence, and move away from the hunter.

In an attempt to generate a wind gauge which animals will not detect, powder-like hydrophobic material, such as unscented raw talc or magnesium trisilicate has been used in an effort to create a wind-borne cloud which the hunter may visually observe. A small amount of the talc material is sprayed into the air by means of a manually operated squeeze bottle. The speed and direction of travel of a cloud created by the dispersed talc is then observed to determine prevailing wind conditions. In actual practice, however, the raw talc settles out of the air relatively quickly and thus drifts only a short distance from the hunter's position. Additionally, the talc cloud is difficult to see. Thus, it is difficult at best for the hunter to actually gauge wind direction and velocity by observing a talc cloud.

It is important for bow hunters to accurately determine the windage which an arrow will experience during the flight to the target. Accuracy is particularly critical, as animals are often alerted to the hunter's presence by the first arrow a hunter shoots, regardless of whether the hunter hits an animal. Because heretofore known powders tend to settle to the ground relatively quickly and are difficult to see, they do not really form an airborne cloud, do not drift far, and once they move away from the point of dispersion hunters can no longer see them. Thus, known windage-gauging powders do not in fact provide hunters with an accurate gauge by which to judge the windage that will act on their arrows.

In addition, many hunters use blinds which they have built either on the ground or elevated from the ground, such as platforms or other such structures secured in trees. Elevated blinds are particularly advantageous as most game, and in particular large animals such as deer and the like, are not thought to be upwardly observant, largely concentrating their surveillance to a horizontal line of sight. Thus, although extremely wary by nature, game such as deer are known to frequently walk directly beneath a hunter occupying an elevated blind in a tree.

Regardless of whether the hunter is stalking or waiting in a blind, and regardless of whether the blind is elevated or on the ground, hunters must remain downwind from the game they hunt or the animals will detect the hunter's scent. The animals are wary of unfamiliar scents, and consequently, avoid moving upwind when they sense an unfamiliar scent. Accordingly, hunters who stalk their prey attempt to monitor the wind direction and maintain a downwind position relative to the prey. For hunters using blinds, the position of the blind is fixed and scents are emitted from the blind and carried downwind. Thus, only those animals upwind from a blind will approach it. To avoid detection by animals downwind from blinds, hunters use masking scents to conceal their own scent. Such masking scents are familiar to game and consequently do not alert the wary animals. In one attempt to cover their scent, hunters have used a masking scent which permeates the talc powder used in an effort to create a wind gauge. The talc powder absorbs the masking scent, such as acorn, pine, apple, cedar or the like. However, as indicated above, talc powder does not travel far, and accordingly the scented powder does not adequately cover the hunter's scent.

In an attempt to attract animals such as deer to a particular location, such as a blind from which they are hunting, hunters also dispense certain scents along a trail leading to that location. However, leaving a scent trail requires that the hunter physically travel over the trail. The hunter's movement along the trail while physically dispensing the scent may well disturb and frighten animals, and the hunter's own scent is often left on the trail. Consequently, animals are likely to move away from the trail instead of being attracted by the scent dispensed by the hunter.

SUMMARY OF THE INVENTION

The present invention provides a novel and useful solution to the foregoing problems in the form of a very fine, lightweight and easily visible powder, which a hunter may easily disperse into the air to create a wind-borne cloud for gauging the wind direction and velocity. Furthermore, the novel wind gauge in accordance with the invention provides a readily-detectable low-density particulate emission which remains airborne and travels large distances under the influence of the wind.

Accordingly, a major object and advantage of the invention is to provide a particulate emission which is easily dispensed in a cloud formed of low-density, fine-consistency particles, easily discernible when dispersed by a hunter in a blind or stalking prey. Because of the small size and low density of the particles emitted, the airborne particulate emission is carried for large distances under the control of air currents.

In one embodiment of the invention, a scent is used to permeate the particles making up the particulate emission. When the powder is dispersed by the hunter, air currents will carry the low-density particles over large distances before they finally settle out and fall to earth. Thus, a floating scent trail is formed without the hunter leaving the blind, and the resulting scent trail attracts animals to the hunter's position.

Embodiments of the invention include a fluorescent thermoplastic which is mixed with a silica to form a highly-visible floating powder cloud. The thermoplastic is odorless and easily visible to hunters. Accordingly, a hunter is able to observe the cloud for large distances and accurately gauge the wind direction and velocity. Because the thermoplastic powder is odorless, and because animals are basically colorblind, animals are not alerted by the floating cloud of colored particles.

BRIEF DESCRIPTION OF THE DRAWINGS

The foregoing major objects and advantages of the invention will be further understood by reference to the attached drawings depicted in a preferred embodiment of the invention, in which:

FIG. 1 is a pictorialized perspective view showing a particle emission according to the invention, dispersed by a hunter for gauging wind parameters;

FIG. 2 is a side elevational view of a squeeze bottle containing the powder for dispersion into the air; and FIG. 3 is a front sectional view of the squeeze bottle for dispersing the powder according to the invention.

DETAILED DESCRIPTION OF THE PREFERRED EMBODIMENT

As generally illustrated in FIG. 1, the novel wind gauge powder 10 in accordance with the invention is utilized to detect the wind speed and direction B. A hunter 12 positioned on a platform blind 13 in a tree 14 dispenses powder 10 into the air using a container 15. Powder 10 is dispensed upwardly from container 15 in direction A when the container is quickly compressed. The dispensed particulate emission is instantly dispersed to form a floating cloud 16 which is carried by the influence of wind B away from hunter 12. The hunter watches the travel of cloud 16 to determine the direction and velocity of wind B. Of course, hunter 12 may also be on the ground when dispersing the particulate matter 10, in which case it is probably even more important to know the wind direction, in order to insure that the hunter's position is downwind from game being stalked.

Powder 10 preferably comprises amorphous hydrophobic fumed silica ($SiO_2$) particles, and are of very small size, i.e. preferably of sub-micron particle size (which is considered to be less than one-tenth micron and not practically measurable). Such particles have a very low density and, surprisingly, it is found that they are extremely buoyant and are carried by the wind over large distances in cloud form. This type of particulate media is also resistant to moisture and caking when stored in a container and is nontoxic and nonhazardous to humans if inhaled. It is also found that amorphous hydrophobic fumed silica particles readily absorb hunting scents placed in container 15 prior to dispensing of the particles.

The silica particles are, in a preferred embodiment, mixed with color particles to increase the visibility of the cloud 16, which is particularly desirable in view of the extremely long persistence of the floating cloud and the corresponding distance it will travel. Orange thermoplastic fluorescent pigmented particles having a sub-micron particle size (and ranging up to about 0.4–0.5 micron) are preferably mixed with the silica particles to effect coloration. The ratio of thermoplastic to silica in one advantageous mixture is approximately 1 to 50. The thermoplastic fluorescent color-pigmented particles are also nontoxic and nonhazardous to humans. Surprisingly, a mixture of thermoplastic and hydrophobic fumed silica was found to be far superior to other powders such as talc, or magnesium trisilicate. The orange pigmented thermoplastic particles are highly visible and accordingly generate a highly visible cloud 16. The small size of the particles in the amorphous hydrophobic fumed silica and thermoplastic mixture permits the cloud to remain airborne and clearly visible over very large distances.

Referring now to FIGS. 2 and 3, the mixture of fumed silica and thermoplastic particles which forms the preferred powder media 10 is preferably placed within a container 15 such as a plastic squeeze bottle. Container 15 includes a compressible polymeric housing 20. Housing 20 may be, by way of example, a 32-ounce polypropylene squeeze bottle which is closed by a cap 21. Of course, other known dispensers may be used to carry and dispense the particles. Cap 21 includes a folding dispenser snout 22. The snout 22 has a bore or passage 24 therethrough having a diameter of about 0.15 centimeter. Surprisingly, it was discovered that a passage of this diameter generates an ideal emission and dispersion tunnel for the airborne particulate media as described above, preferably comprising the silica and thermoplastic mixture.

In the embodiment of the invention where scent is to be carried by the floating cloud of media, a layer of neutral viscous fluid 23, impregnated with a scent illustrated by the numeral 26 in FIGS. 2 and 3, is disposed along the bottom of container 15. The amorphous hydrophobic fumed silica and color pigmented thermoplastic particle mixture is next placed in container 15 over the viscous fluid. The container is most preferably filled to no more than 75% of its maximum capacity by the total mixture. The top 25% of the container volume will accordingly be air, which provides the pressure for dispensing the particles when housing 20 is sharply compressed. Cap 22 is secured to the top of the housing 20 after the mixture is placed therein. The masking scent 23 is quickly absorbed into the silica particles after the mixture is placed in the container. Most preferably, the scents are apple/deer musk and acorn/deer musk, although many others may also be used. These scents are quickly absorbed into each particle of the mixture such that each particle dispersed from the container carries the scent.

In operation, a hunter on blind 13 rapidly squeezes the bottle to disperse a small particulate emission, which then forms the cloud 16. The cloud 16 formed by the particulate emission is carried by wind B to location D remote from the hunter. As indicated above, because of the small size of the particles in cloud 16, the particulate emission hangs in the air for some time and is carried airborne over a significant distance. For example, the particle cloud will be carried by even very light winds over distances of at least 200 yards. If the wind is stronger, the powder may be carried over distances exceeding a mile. A deer 25 downwind from hunter 12 will detect the scent, and may be attracted to the hunter's blind 13 from a considerable distance away. Even though the size of the particles is small, the thermoplastic particles having a bright orange pigmentation are readily visible to the hunter for great distances. The hunter watches cloud 16 as it is carried by the wind, and accordingly gauges the wind direction and speed as the wind carries the scent-impregnated cloud along. Additionally, because the cloud is visible for large distances and does not settle to the ground rapidly, hunter 12 may accurately gauge the windage that will affect arrow 26 as it travels toward deer 25 when the hunter shoots the arrow.

In accordance with the novel wind gauge method and apparatus provided herewith, a readily visible low-density particulate mixture and dispenser is provided which may be very conveniently carried by a hunter. The very low density of the amorphous hydrophobic fumed silica and thermoplastic particles facilitates the responsiveness of the cloud formed thereby to ambient wind currents Accordingly, the particulate emission created by the mixture is carried at a velocity approximately equal to the wind velocity. A hunter observing the movement of cloud 16 may accurately determine the wind velocity and thus gauge the windage which will act on arrows shot from the blind. Additionally, the particulate emission is carried by the wind over large distances. A scent trail resulting from the powder as it gradually settles out of the air is long and attracts animals to the hunter from large distances. Because the particles carried by the wind may be essentially scentless, they will not themselves alert or frighten the game; alternatively, since they may be given a relatively strong, familiar scent, animals such as deer 25 will not detect the hunter's unfamiliar scent. Accordingly, animals may thus be attracted to the hunter's position.

Accordingly, it will be seen that a novel and highly useful device for hunters is provided in accordance herewith, by which the windage may be detected and a scent distributed along a scent trail leading to a hunter's blind. As may be appreciated, the preferred mixture disclosed and described herein is efficient and economic to manufacture, and is useable over an extended period, thereby facilitating its ownership and utilization by a hunter.

It is to be understood that the foregoing description of a preferred embodiment of the invention is provided for purposes of the description and illustration, and not as a measure of the invention, whose scope is to be defined by reference to the ensuing claims. Thus, while those skilled in the art may devise embodiments of the particular concepts presented in the foregoing illustrative disclosure which differs somewhat from the particular embodiment shown and described in detail herein, or may make various changes in structural details to the illustrated embodiment, all such alternative or modified embodiments which utilize the concepts of the invention and clearly incorporate the spirit thereof are to be considered as within the scope of the claims appended here below, unless such claims by their language specifically state otherwise.

The embodiments of the invention in which an exclusive property or privilege is claimed are defined as follows.

1. A wind gauge of the type comprising a dispensable particulate media which when windborne indicates the wind direction, comprising:
   power-like silica particles; and
   color pigmented thermoplastic particles;
   said media comprising a mixture of said thermoplastic particles and silica particles which provides a cloud-like dispersion when dispensed into the air, such dispersion being airborne under the influence of ambient wind and readily visually observable to gauge windage as it is carried by the wind.

2. The wind gauge as defined in claim 1 wherein said powder-like silica particles comprise amorphous hydrophobic fumed silica.

3. The wind gauge as defined in claim 1 wherein said pigmented thermoplastic particles embody a fluorescent color.

4. The wind gauge as defined in claim 2 wherein said pigmented thermoplastic particles have a fluorescent coloration.

5. The wind gauge as defined in claim 1 wherein the maximum particle size of said thermoplastic pigmented particles is approximately 0.4 to 0.5 micron.

6. The wind gauge as defined in claim 1 wherein the ratio of thermoplastic particles to silica particles is approximately 1 to 50.

7. The wind gauge as defined in claim 1 wherein said media includes a selected scent component.

8. A wind gauge comprising:
   a container;
   powder-like silica particles contained within said container; and
   color-pigmented particles intermixed with said silica particles in said container;
   said container having means for dispensing said mixture of silica particles and color-pigmented particles outwardly from said container to form an airborne particulate emission which is visually observable to gauge windage conditions.

9. The wind gauge as defined in claim 8 wherein said powder-like silica particles comprise amorphous hydrophobic fumed silica.

10. The wind gauge as defined in claim 8 wherein said pigmented particles are of a fluorescent color.

11. The wind gauge as defined in claim 10 wherein the maximum size of said pigmented particles is approximately 0.4 to 0.5 micron.

12. The wind gauge as defined in claim 8 wherein the ratio of pigmented particles to silica particles is about 1 to 50.

13. The wind gauge as defined in claim 8 wherein at least some of said particles are scented.

14. A hunter's scent dispenser which emits a particulate cloud-like dispersion that is airborne under the influence of ambient wind, comprising:
   a dispenser housing;
   a quantity of fine, lightweight silica particles of sub-micron particle size disposed inside said housing, said silica particles being dispensable from said housing and being sufficiently buoyant to form a particulate cloud-like dispersion which remains airborne for a substantial interval under the influence of the wind;
   a scent media in said housing, said scent being carried with said buoyant silica particles upon their dispensing from said housing, whereby said airborne silica particles and scent media provide a scent trail of long persistence; and
   a plurality of fine, buoyant color-pigmented particles mixed with said silica particles as part of said cloud-like dispersion to thereby enhance visual determination of said scent trail.

15. The hunter's scent dispenser as defined in claim 14 wherein said silica particles comprise amorphous hydrophobic fumed silica.

16. The hunter's scent dispenser as defined in claim 14 wherein said scent media is absorbed by said silica particles.

17. The hunter's scent dispenser as defined in claim 14 wherein said pigmented particles have a fluorescent color to further enhance said visual determination.

18. The hunter's scent dispenser as defined in claim 14 wherein said pigmented particles comprises a thermoplastic material.

19. The hunter's scent dispenser as defined in claim 15 wherein said scent media comprises a deposit of viscous fluid disposed in said housing within said quantity of silica particles.

20. A method of gauging wind direction and velocity, comprising the steps of:
providing a plurality of silica particles of sufficiently small size to be buoyantly carried by ambient wind;
dispensing said silica particles as a buoyant cloud-like dispersion to be carried by said wind;
introducing color to said particles before dispensing them by using a plurality of color-pigmented particles, to provide a colored cloud-like dispersion of enhanced visibility; and
observing the direction and rate of travel of said cloud to gauge wind direction and velocity.

* * * * *